United States Patent
Woodroofe et al.

(12)

(10) Patent No.: US 6,221,380 B1
(45) Date of Patent: *Apr. 24, 2001

(54) PRODUCING PROTECTED PROTEIN FOR RUMINANT FEED BY COMBINING PROTEIN WITH REDUCING CARBOHYDRATE

(76) Inventors: Jonathan Malcolm Woodroofe, 7 Noonan Grove, Woodend, VIC 3442; Alan William Cockbill, Heart Street, Dandenong, VIC 3175, both of (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,984
(22) PCT Filed: Aug. 7, 1995
(86) PCT No.: PCT/AU95/00479
§ 371 Date: Feb. 6, 1997
§ 102(e) Date: Feb. 6, 1997
(87) PCT Pub. No.: WO96/04803
PCT Pub. Date: Feb. 22, 1996

(30) Foreign Application Priority Data

Aug. 8, 1994 (AU) .................................. PM 7312

(51) Int. Cl.⁷ .................................................. A23K 1/16
(52) U.S. Cl. ...................... 424/438; 424/442; 426/635; 426/807
(58) Field of Search .................... 424/438, 442; 426/49, 50, 52–54, 388, 438, 442, 455, 456, 465, 506, 507, 519, 520, 531, 656, 658, 807, 635

(56) References Cited

U.S. PATENT DOCUMENTS

| 4,957,748 | 9/1990 | Winowiski | 426/2 |
| 5,064,665 | 11/1991 | Klopfenstein et al. | 426/2 |

FOREIGN PATENT DOCUMENTS 0 628 257  12/1994 (EP).
WO 93/25616  12/1993 (WO).

OTHER PUBLICATIONS

Marounek et al., "Heat–induced formation and soluble Maillard reaction products and its influence on utilization of glucose by rumen bacteria". Chemical Abstracts, vol. 122, No. 1, Issued Jan. 2, 1995, p. 999, abstract No. 8749j.

Taniguchi et al., "Combinations of different sources of starch and protetin. Effects on site and extent of carbohydrate digestion in steers". Chemical Abstracts, vol. 116, No. 9, Issued Mar. 2, 1992, p. 722, abstract No. 8265h.

Emile et al Ann ZooTech (Paris) 40(1) 1991 31–44.*

* cited by examiner

Primary Examiner—Neil S. Levy
(74) Attorney, Agent, or Firm—Michael Best & Friedrich LLP

(57) ABSTRACT

The present invention relates to improving the biological efficiency of utilization of protein in ruminant feeds by protection of such protein from substantial degradation in the rumen without markedly reducing the subsequent absorption of the amino acid constituents of the protein in the lower digestive tract. In one aspect of the invention this is achieved by mixing a protein containing material with a reducing carbohydrate and subjecting the mixture to heat, pressure and shear forces.

8 Claims, No Drawings

PRODUCING PROTECTED PROTEIN FOR RUMINANT FEED BY COMBINING PROTEIN WITH REDUCING CARBOHYDRATE

The present invention relates to improving the biological efficiency of utilization of protein in ruminant feeds by protection of such protein from substantial degradation in the rumen without markedly reducing the subsequent absorption of the amino acid constituents of the protein in the lower digestive tract. In one aspect of the invention this is achieved by mixing a protein containing material with a reducing carbohydrate and subjecting the mixture to heat, pressure and shear forces.

BACKGROUND OF THE INVENTION

True dietary protein consists of amino acids joined together in various combinations. In the field of ruminant livestock nutrition, it is known that under some circumstances protecting dietary protein from extensive degradation in the rumen by microbial enzymes can lead to an increase in the outflow of amino acids from the rumen and/or a change in the balance of amino acids reaching the lower gut. In circumstances where the supply or balance of amino acids reaching the lower gut is metabolically limiting, supplementation of the diet with protein that is partially protected from degradation by rumen microbes can improve productivity in terms of improved efficiency of meat, milk and wool or hair production. Specifically, increased production of these products may be achieved with a given dietary protein content where part of this protein content is protected from ruminal degradation or, alternatively, equivalent levels of production of these products may be achieved with reduced true dietary protein content where part of this protein content is protected from ruminal degradation.

Various methods have been used for protecting proteins from ruminal degradation including the simple application of heat. In the following discussion, reference is made to the list of publications given at the end of this specification. Chemical agents such as formaldehyde (Reis and Tunks, 1969), alcohol (van de Aar et al,1982), bentonites (Britton et al, 1978), zinc (Britton and Klopfenstein, 1986), tannins (Driedger and Hatfield, 1972), and sodium hydroxide (Mir et al, 1984) have also been used successfully to treat protein as a means of reducing ruminal degradability. All these methods of treatment, including heating, are thought to act either by inhibiting proteolytic activity and/or by modifying protein structure in such a way that the number of protease specific bonds that can be cleaved by microbial enzymes is decreased.

A specific method of improving the efficiency of utilization of protein by ruminants utilizing a mixture of a reducing carbohydrate and proteinaceous material was first described in Cleale, R. M., T. J. Klopfenstein, R. A. Britton and L. D. Satterlee, 1986, "Induced non-enzymatic browning of soybean meal for enhancing efficiency of protein utilization by ruminants", J. Anim. Sci. 63 (Suppl. 1):139, (Abstr.). Subsequently, U.S. Pat. No. 4,957,748 and U.S. Pat. No. 5,064,665 disclosed methods of preparing feeds for ruminants that include proteins and reducing carbohydrates or the reaction products between these compounds. None of these methods suggest the application of pressure and shear forces to improve the degree of protein protection and hence increase the efficiency of utilization of the protein by ruminant animals. U.S. Pat. No. 4,957,748 and U.S. Pat. No. 5,064,665 also cite examples of soybean meal treated with Xylose (a reducing carbohydrate) such that the ruminal escape of the protein content was approximately 2.6 times that of commercial untreated soybean meal when measured in an in vivo trial. These documents also suggest improvements in protein use efficiency for proteins subjected to early Mallard type reactions of at least 50% and in some circumstances 100%.

Methods utilizing reactions between proteins and reducing carbohydrates to protect protein from ruminal degradation basically involve the Maillard reaction, a well known chemical reaction also known as non-enzymatic browning. The first stage of this reaction involves condensation of a reducing sugar and an amino acid contained in a protein molecule to form a Schiff base. The next stage of the reaction involves rearrangement to form a more stable Amadori product. If further reaction takes place indigestible melanoidins may be formed. For the protein to be available to the animal in the lower digestive tract it is thought to be necessary to arrest the Maillard reaction in its early stages.

The rate and extent of formation of Maillard products is known to be dependent on the temperature, pH and water content of the material. The rate and extent also depends upon the particular reducing carbohydrate present and the amino acid composition of the protein. It is also probable that the tertiary structure of the protein may inhibit the extent of the reaction especially where reducing carbohydrates of higher molecular size are involved due to steric hindrance.

An extruder or expander barrel may be thought of as a reaction chamber where pressure, physical forces and heat are concurrently applied to material passing through the machine. These factors may accelerate and/or modify chemical reactions. The heat, pressure and shear forces involved in extrusion are also know to disrupt the tertiary structure of proteins by breaking secondary bonds which may reduce steric hindrance in Maillard type reactions. Extrusion may also cause cross linking within the protein structure that partially protects it from ruminal degradation and reduces the number of cleavable sites in the molecule, hence reducing the amount of chemical reagent needed to protect the remainder of these sites if further protection is required. Extrusion per se has also been shown to reduce ruminal protein degradability without markedly reducing amino acid absorption in the lower digestive tract (Stern et al, 1980).

Cros, P., R. Moncoulon, C. Bayourthe and M. Vernay, 1992,"Effect of Extrusion on Ruminal and Intestinal Disappearance of Amino Acids in White Lupin Seed", Canadian Journal of Animal Science 72:89–96, describes the effect of extruding white lupin seed at 120 or 150° C. It was found that protein degradability in Nylon bags incubated in the rumens of Holstein cattle for sixteen hours was reduced to 73.6% for the higher extrusion temperature compared to 98.4% for the unprocessed lupin control. It was also found that the amino acid composition of the extruded protein that escaped ruminal digestion differed markedly both quantitatively and qualitatively from its initial composition. Comparisons with milk protein composition enabled the authors to postulate that the ruminally undegraded protein that subsequently disappeared in the intestine showed a higher protein quality than the original protein.

For a treatment to be beneficial in practice it is important to achieve maximum protection of dietary protein from ruminal degradation without markedly reducing lower gut absorption of its amino acid content, at minimum cost. It is also important to obtain a predictable result, and it would be beneficial if the biological value of the protein that escapes ruminal degradation were higher than the biological value of the original dietary protein.

The following descriptions will show that the present invention offers a more effective method of protecting protein than either simple extrusion, or use of Maillard type reactions without the concurrent application of pressure and shear forces.

DESCRIPTION OF THE INVENTION

It is an object of this invention to provide a novel and superior method of processing protein containing materials such that the efficiency of utilization of treated dietary protein by ruminant animals may be improved.

The present invention is based in part upon the recognition that heat treatment per se tends to decrease the degradability of proteins in the rumen, however, excessive heating may overprotect proteins so that they are indigestible in the lower gut. Overprotection of proteins through excessive heating may occur because it promotes advanced Maillard reactions and/or causes unnatural amide bonds to form between the amino group of lysine and carbonyl groups of protein (Bjarnason and Carpenter, 1969). The heating process must therefore be carefully controlled to give maximum benefit.

Cooker-extruders are an ideal means of applying high temperatures for short times in a controlled manner, with the concurrent application of shear forces and pressure on the product which may advantageously modify protein structure and speed up, increase the extent of, or modify chemical reactions. For this reason this invention employs processing with a cooker extruder to apply heat, pressure and shear forces to mixtures of materials containing protein. However, application of heat, pressure and shear force are the factors pertinent to this invention, not extrusion per se, and these may be applied in various other ways than by extrusion in accordance with the objectives of this invention.

The invention also provides a method of mixing together reagents, including protein, water and reducing carbohydrates in proportions that when subjected to heat, pressure and shear forces followed by post conditioning, serve to reduce the degradability of the protein in the rumen of ruminant animals, but not markedly reduce absorption of the protein or its amino acid constituents in the lower digestive tract.

Also within the scope of the present invention is a method of protecting protein in such a way that the biological value of the protein that escapes degradation in the rumen of ruminant animals may be improved relative to the biological value of the treated protein originally fed.

The invention also covers ruminant feeds comprising some is protein treated in the manner described which is then mixed with other feed materials. Such feed mixtures may or may not be pelletized before feeding.

The invention also comprehends methods of feeding ruminants comprising the steps of selecting feed materials and mixing them with protein containing material processes according to the invention, and feeding the resultant mixture to ruminants.

The invention will now be explained in more detail in the following non-limitative description.

Suitable protein sources for use in this invention include, casein, rapeseed, canola, sunflower, safflower, soya, vetch, lupin, linseed, sesame, lentil, cotton, groundnut, maize, Brewer's yeast, peas, beans, tomato pip, dried red blood, milk, fish meal, meat meal, meat and bone meal, feather meal, poultry offal, shrimp meal, krill meal, squid meal, synthetic protein, synthetic amino acids, gelatin, distillers and brewers grains, coconut, wheat, barley, oats, rye, rice, sorghum, milo, lucerne, triticale or mixtures or by-products thereof.

Particularly suitable for use as a protein source in this invention is lupin seed due to its availability, cost and the fact that in its unprocessed state it is extensively degraded in the rumen but when processed effective degradability of its protein content can be reduced from over 92% to less than 50% (in excess of a 6 fold increase in ruminal escape protein) as shown in the following example.

Suitable carbohydrates for use in the present invention include glucose, xylose, arabinose, fructose, ribose, galactose, mannose, maltose and lactose. Sucrose could also be used following hydrolysis under acid conditions as could a range of products containing reducing sugars or their hydrolysates including molasses (particularly cane molasses), hemicellulose extracts, spent sulphite liquor, malt extract milk products, and corn products.

As an alternative to mixing separate sources of reducing carbohydrate and proteins, endogenous starches and/or polysaccharides present in the protein source might be used in the process described by this invention. In this case extrusion which can disrupt the structure and cleave starch molecules may serve a role in producing a reactive material, as could pre-treatment with enzymes such as amylases, cellulases, lactases, amyloglucosidases, xylanases, arabinofuranosidases, beta-glucanases, galactosidases, invertases, and pectinases.

This method of protecting proteins from ruminal degradation employs heat, pressure and shear forces and chemical reactions. The whole process must be conducted in such a way that protein is protected from ruminal degradation, but not over protected such that it would be totally unavailable to ruminant animals consuming feed containing the treated protein.

Generally, this invention may be described as involving the follows steps. Materials containing proteins and reducing carbohydrates are combined together and moisture level and pH is then adjusted prior to pressure, shear forces and heat being applied for a brief period. Following this the material mixture, at suitable moisture level and pH, is held at temperatures and for periods sufficient to promote further advantageous chemical reactions which are though to primarily be Maillard reactions. The material is then cooled and dried to levels suitable for storage.

Generally the proteinaceous material used will be suitable for use as a ruminant animal feed and in its untreated state will contain protein that is more than 20% ruminally degradable.

The relative amounts of reducing carbohydrate and protein used according to this invention can vary according to the precise nature of the reagents, their physical state (eg. particle size) and the combination and intensity of time and heat, pressure and shear forces used. For example, where the reducing sugar is glucose and the protein is derived from partially dehulled lupins, around 9% to 11% by weight of carbohydrate relative to protein was found to be effective under the conditions applied in the example described below. However, levels of reducing carbohydrate relative to protein by weight of as low as 0.5 % and as high as 50% could be used.

It is know that the higher the pH, the greater the extent of the Maillard reaction. For commercial processing, however, a near neutral pH would be preferred for this process ranging from about 6 to 9. The pH can be controlled by any suitable conventional method including adding alkalis or acids to the mixture being processed.

Water can be added during this process both prior to and during the application of heat, pressure and shear forces. Generally, the moisture content of the mixture being processed varies during the process within the range 10% to 40%.

The temperatures and pressures achieved during this process vary during the process. During the phase involving the concurrent application of heat and pressure (the extrusion phase) temperatures of up to 190° C., for example, between 80° and 190° C., and pressures of up to 700 p.s.i. (4,826 KPa) for example, between 30 and 700 p.s.i. may be applied for short periods (generally less than 30 seconds). Normally, during this phase temperatures of 100 to 165° C., for example 110 to 165° C., and pressures of 300 to 500 p.s.i. (2,068 to 3,447 KPa) are applied. During the subsequent post conditioning phase temperatures ranging between 30 and 100° C. are applied at atmospheric pressure for periods ranging from 15 minutes to 24 hours with periods of less than 2 hours being preferred.

There is no way to measure and quantify the physical shear forces applied during the process.

Protein processed in this way is intended for feeding to ruminant animals as part of a complete balanced diet. At least 50% and with some materials up to, or in excess of, a 600% (that is, a six-fold) increase in the amount of the protein that escapes ruminal degradation under practical feeding conditions may be achieved. This can greatly increase the efficiency of utilization of dietary protein in some circumstances and hence either reduce the amount of true protein required in the complete diet or enhance the productivity of the animal being fed in terms of live-weight gain, milk production, milk composition or the production of wool or hair.

The invention will now be described in greater detail by way of a example. The example is for illustrative purposes only and is in no way intended to limit the scope of the invention.

EXAMPLE

1. Treatment of Samples

A mixture containing 2.5% by weight of dextrose, 0.5% by weight of sodium hydroxide, 10% by weight of added tap water and 87% by weight of ground, partially dehulled lupin was blended in a horizontal paddle mixer for ten minutes. The ground, partially dehulled lupin contained approximately 30% crude protein.

Following blending the material was extruded using an Insta-Pro Model 2000R Extruder. Varying amounts of water were added during the process and varying feed rates were applied so that samples that had been subjected to differing extrusion conditions could be collected. The extrusion process was allowed to stabilize before the collection of each sample. Five such samples were collected in polystyrene boxes at intervals during the process directly from the end of the extruder and for each sample the barrel end temperature, water injection rate and feed rate were recorded. Immediately after each sample box was full it was sealed with a polystyrene lid. Hot samples were kept in their insulating, polystyrene boxes for varying periods then emptied out and allowed to cool on a flat surface prior to being air dried. Table 1. illustrates the processing conditions applied to each sample.

TABLE 1

TREATMENT OF SAMPLES

| SAMPLE NUMBER | 1 | 2 | 3 | 4 | 5 |
|---|---|---|---|---|---|
| EXTRUDER BARREL END TEMPERATURE (C.) | 120 | 120 | 120 | 150 | 155 |
| APPROX. WATER INJECTION RATE (APPROX % OF WATER ADDED TO SAMPLE BY WEIGHT DURING EXTRUSION) | 10 | 10 | 10 | 20 | 6 |
| DRY MATERIAL FEED RATE (% OF MAXIMUM POSSIBLE RATE) | 40 | 40 | 40 | 55 | 40 |
| TIME KEPT IN INSULATED CONTAINER PRIOR TO COOLING (MINUTES) | 30 | 60 | 90 | 60 | 90 |

2. Testing of Samples

All five samples plus one control sample (Sample number 6) of unprocessed, ground, partially dehulled lupin were analyzed for Dry Matter, Crude Protein, Neutral Detergent Fibre, Acid Detergent Fibre, and Acid Detergent Insoluble Protein (N×6.25), see Table 2.

The acid detergent insoluble nitrogen (ADIN) is the nitrogen associated with the cellulose fraction of the fibre and that is considered to be indigestible by ruminant animals.

The samples (in duplicate) were also analyzed for in sacco dry matter and crude protein degradability using the nylon bag technique in four lactating, rumen fistulated cows grazing high quality pasture. The four cows were producing 22 (+/−1) litres per day.

3. Results and Discussion

Calculations of the results of this study were based on methods outlined in AFRC (Agricultural Food Research Council, UK) Technical Committee on Responses to Nutrients., 1992, Report No. 9., Nutritive Requirements of Ruminant Animals: Protein, C.A.B. International, Nutrition Abstracts and Reviews (Series B), Volume 62, No. 12:789–835.

With regard to Dry Matter Degradability (Table. 3), the readily soluble fraction (a) is the calculated loss of dry matter that is rapidly lost from the nylon bag (this always tends to be lower than the immediately soluble in water fraction). The degradable fraction is the proportion that will potentially be fermented in the rumen. The fractional degradation rate is expressed as the percentage of dry matter fermented per hour.

The effective degradability is the calculated proportion of dry matter that will be fermented in lactating cows fed high quality herbage (in this case grazing a ryegrass/white clover pasture). For example this suggests that 75% of sample 6 (the untreated control sample) but only 57% of sample 5, would be fermented in the rumen if fed as a supplement to a lactating, grazing cow.

With regard to Crude Protein Digestibility (Table 4), the same description applies to the degradability of protein. However, a further description of the crude protein degradability is provided in the last four columns of Table 4.

The calculations again assume that this is what would happen in a lactating cow grazing herbage. The effective ruminal protein degradability (ERDP) fraction is calculated assuming that only 80% of fraction a is actually utilized by the rumen microbes, because Fraction a is rapidly solubilised. Thus ERDP is an estimate of the usefulness of the degradable protein.

The undegraded dietary protein (UDP) is a calculated measure of the bypass (undegraded) protein content of the feed. Only 8% of the crude protein in Sample 6 (the untreated control sample) is bypass protein; whereas Sample contains 50%, or approximately 6 times as much, bypass protein.

The digestible undegraded dietary protein (DUP) content of the sample is calculated as indicated in Table 4. the calculation assumes that the cow can only absorb 90% of the bypass feed protein, and it assumes that the protein fraction associated with the fibre is indigestible. Thus DUP is a measure of the amino acid fraction of feed that is actually absorbed and available to the animal for maintenance or production. That is, although sample 6 (the untreated control sample) contains 8% bypass protein, it is of no use to the lactating cow, effectively it provides no metabolisable protein. Sample 5, on the other hand is not adversely affected by the treatment used to increase bypass protein content because acid detergent insoluble nitrogen (ADIN) content was not appreciably higher than the other samples. In fact 37% of the protein content of this sample (111 g protein/ kg DM) can be classified as metabolisable undegraded protein.

The overall results thus show that the process has the capacity to raise the amount of protein that escapes rumen degradation but that can be subsequently absorbed effectively by a ruminant in the lower gut from zero in an unprocessed sample to around 37% of the total protein content. This suggests that the process has the capacity to dramatically improve the efficiency of protein utilization in ruminants.

Extruding at lower moisture contents increases the severity of the physical forces applied to the extrudate because water acts as a lubricant. The results would tend to suggest that the severity of the physical forces (shear forces and pressure) applied to the extrudate tends to have a marked effect on the degree of ruminal protection achieved.

TABLE 2

CHEMICAL ANALYSIS OF SAMPLES (g/kg DRY MATTER)

| SAMPLE | DRY MATTER | PROTEIN (N × 6.25) | NEUTRAL DETERGENT FIBRE | ACID DETERGENT FIBRE | ADIN (× 6.25) |
|---|---|---|---|---|---|
| 1 | 942 | 296 | 147 | 134 | 7.5 |
| 2 | 934 | 302 | 144 | 125 | 7.5 |
| 3 | 952 | 301 | 189 | 127 | 5.0 |
| 4 | 928 | 297 | 157 | 125 | 5.0 |
| 5 | 953 | 299 | 190 | 124 | 8.2 |
| 6 | 925 | 298 | 164 | 142 | 7.5 |

TABLE 3

DRY MATTER DEGRADABILITY

| SAMPLE | IMMEDIATELY SOLUBLE (IN WATER) (%) | READILY SOLUBLE FRACTION (a) (%) | DEGRADABLE FRACTION (b) (%) | FDR OF FRACTION b (c) (%/HOUR) | EFFECTIVE DEGRADABILITY (P) (%) |
|---|---|---|---|---|---|
| 1 | 49.3 | 43.1 | 54.4 | 5.85 | 66.1 |
| 2 | 51.3 | 40.3 | 56.0 | 5.55 | 63.2 |
| 3 | 46.2 | 42.0 | 52.8 | 5.54 | 63.6 |
| 4 | 47.2 | 41.0 | 55.7 | 7.70 | 68.3 |
| 5 | 42.3 | 34.0 | 63.2 | 4.70 | 56.7 |
| 6 | 54.7 | 52.8 | 47.2 | 7.04 | 74.9 |

FDR—fractional degradation rate

TABLE 4

PROTEIN DEGRADABILITY

| SAMPLE | IMMEDIATELY SOLUBLE (IN WATER) (%) | READILY SOLUBLE FRACTION (a) (%) | DEGRADABLE FRACTION (b) (%) | FDR OF FRACTION b (c) (%/HOUR) | EFFECTIVE DEGRADABILITY (P) (%) | ERDP (% OF TOTAL CP) (%) | UDP (% OF TOTAL CP) (%) | ADIN (gn/kg DM) (%) | DUP (% OF TOTAL CP) (%) |
|---|---|---|---|---|---|---|---|---|---|
| 1 | 57.0 | 49.7 | 50.3 | 4.47 | 67.8 | 57.8 | 32.3 | 1.2 | 21.6 |
| 2 | 59.4 | 45.9 | 54.1 | 3.71 | 63.0 | 53.9 | 37.0 | 1.2 | 25.8 |
| 3 | 50.5 | 46.7 | 51.8 | 3.58 | 62.8 | 53.4 | 37.3 | 0.8 | 28.6 |
| 4 | 53.1 | 45.5 | 54.5 | 5.94 | 68.7 | 59.6 | 31.3 | 0.8 | 23.2 |
| 5 | 38.0 | 29.8 | 68.9 | 3.25 | 49.7 | 43.7 | 50.3 | 1.3 | 37.1 |
| 6 | 80.0 | 74.9 | 23.2 | 23.55 | 92.2 | 77.2 | 7.8 | 1.2 | 0.0 |

FDR—fractional degradation rate
ERDP—effective ruminal protein degradability
UDP—undegraded dietary protein
DUP—digestible undegraded dietary protein = (0.9 × UDP) − (ADIN × 6.25)

REFERENCES

PATENT DOCUMENTS
U.S. Pat. No. 4,957,748 (THOMAS S. WINOWSKI) Sept. 18, 1990.
U.S. Pat. No. 5,064,665 (TERRY J. KLOPFENSTEIN ET AL) Nov. 12, 1991.

OTHER PUBLICATIONS
AFRC Technical Coammittee on Responses to Nutrients., 1992, Report No. 9., Nutritive Requirements of Ruminant Animals: Protein, C.A.B. International, Nutrition Abstracts and Reviews (Series B), Volume 62, No. 12:789.

Bjarnason, J., and K. J. Carpenter, 1969, Mechanisms of heat damage in protein. I. Models with acylated lysine units, Brit. J. Nutr., 23:859.

Britton, R. A., D. P. Colling, and T. J. Klopfenstein, 1978, Effect of complexing sodirm bentonite with soybean meal or urean in vitro ruminal ammonia release and nitrogen utilization in ruminants, J. Anim. Sci. 46:1738.

Britton, R. A., and T. J. Klopfenstein, 1986, Zinc treated soybean meal: A method to increase bypass, Nebraska Beef Cattle Rep. MP 50, pp 45–47, univ. of Nebraska, Lincoln.

Cleale, R. A., and T. J. Klopfenstein, R. A. Britton and L. D. Satterlee, 1986, Induced non-enzymatic browning of soybean meal for enhancing efficiency of protein utilization by ruminants, J. Anim. Sci. 63 (Suppl. 1):139, (Abstr.).

Cros, P., R. Moncoulon, C. Bayourthe and M. Vernay, 1992, Effect of Extrusion on Ruminal and Intestinal Disappearance of Amino Acids in White Lupin Seed, Canadian J. of Anim. Sci. 72: 89.

Driedger, A., and E. E. Hatfield, 1972, Influence of tannins on the nutritive value of soybean meal for ruminants, J. Anim. Sci. 34: 465.

Mir, Z., G. K. MacLend, J. G. Buchanan-Smith, D. G. Grieve, and W. L. Grovum, 1984, Effect of feeding soybean meal protected with sodium hydroxide, fresh blood or fish hydrolyzate to calves and lactating dairy cows, Canadian J. Anim. Sci. 64:845.

Reis, P. J., and D. A. Tunks, 1969, Evaluation of formaldehyde treated casein for wool growth and nitrogen retention, Aust. J. Agric. Res. 20: 775.

Stern, M. D., K. A. Santos, D. C. Walkley and L. D. Satter, 1980, J. Anim. Sci. 50 (Suppl. 1):700 (Abstr.).

van der Aar, P. J. L. L. Berger, G. C. Fahey, 1982, The effect of alcohol treatments on solubility and in vitro and in situ digertibilities of soybean meal protein, J. Anim. Sci. 55:1179.

The claims defining the invention are as follws:

1. A method of making a ruminant feed or feed supplement comprising:
    mixing together a reducing carbohydrate with a protein containing material such that the reducing carbohydrate is present in the mix at between 6 and 15% by weight of the protein, and if necessary, adjusting the moisture content of the mix to between 10% and 30% and the pH to between 6 and 9;
    applying shear forces and pressures of between 300 and 500 p.s.i. (2,068 to 3,447 KPa) whilst concurrently heating the material to between 100° C. and 165° C.;
    maintaining the temperature of the processed mixture above 70° C. for a period from 15 minutes up to 2 hours; and
    cooling and drying the mixture to a level where it is stable for storage.

2. A method according to claim 1 wherein the protein is derived from lupin seed.

3. A method according to claim 1 wherein the protein is derived from any of casein, rapeseed, canola, sunflower, safflower, soya, vetch, linseed, sesame, lentil, cotton, tomato pip, groundnut, maize, Brewer's yeast, peas, beans, dried red blood, milk, fish meal, meat meal, meat and bone meal, feather meal, poultry offal, shrimp meal, krill meal, squid meal, synthetic protein, synthetic amino acids, gelatin, distillers and brewers grains, coconut, wheat, barley, oats, rye, rice, sorghum, lucerne, triticale or mixtures or by-products thereof.

4. A method according to claim 1 wherein the reducing carbohydrate is partially or wholly derived from glucose, xylose, arabinose, fructose, ribose, galactose, mannose, maltose and lactose or mixtures thereof.

5. A method according to claim 1 wherein the reducing carbohydrate is partially or wholly derived from sucrose following hydrolysis thereof.

6. A method according to claim 1 wherein the reducing carbohydrate is partially or wholly derived from products containing reducing sugars or their hydrolysates including molasses, hemicellulose extracts, spent sulphite liquor, calcium lignosulphonate, malt extract, milk by-products, and corn by-products.

7. A method according to claim 1 wherein the reducing carbohydrate instead of being externally sourced is partially or wholly derived from endogenous starches and/or polysaccharides present in the protein source by extrusion and/or by treatment of the source with enzymes including, amylases, cellulases, lactases, amyloglucosidases, xylanases, arabinofuranosidases, beta-glucanases, galactosidases, invertases, and pectinases.

8. A method of making a ruminant feed or feed supplement comprising:
    mixing together a reducing carbohydrate with a protein containing material such that the reducing carbohydrate is present in the mix at between 0.5 and 50% by weight of the protein, and if necessary, adjusting the moisture content of the mix to between 10% and 40% and the pH to between 6 and 9;a
    passing the mixture through a cooker-extruder or expander so as to achieve final extrusion temperatures of between 80° C. and 190° C. and so as to apply not only heat but also shear forces, extra water and pressure of between 30 and 700 p.s.i. (207 to 4,826 Kpa);
    maintaining the temperature of the extruded mixture above 30° C. for a period from 15 minutes up to 24 hours; and
    cooling and drying the mixture to a level where it is stable for storage.

* * * * *